(12) United States Patent
Hanita et al.

(10) Patent No.: US 9,669,760 B2
(45) Date of Patent: Jun. 6, 2017

(54) WARNING DEVICE

(71) Applicant: TOYOTA JIDOSHA KABUSHIKI KAISHA, Toyota-shi, Aichi-ken (JP)

(72) Inventors: Kiyoto Hanita, Susono (JP); Shinya Kawamata, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 14/969,356

(22) Filed: Dec. 15, 2015

(65) Prior Publication Data

US 2016/0167580 A1 Jun. 16, 2016

(30) Foreign Application Priority Data

Dec. 15, 2014 (JP) ................................ 2014-253151

(51) Int. Cl.
| | |
|---|---|
| *G06F 17/10* | (2006.01) |
| *B60Q 9/00* | (2006.01) |
| *G08G 1/16* | (2006.01) |
| *G01S 17/93* | (2006.01) |
| *G06K 9/00* | (2006.01) |
| *B60W 30/16* | (2012.01) |
| *G01S 17/08* | (2006.01) |

(52) U.S. Cl.
CPC ............ *B60Q 9/008* (2013.01); *G01S 17/93* (2013.01); *G06K 9/00805* (2013.01); *G08G 1/16* (2013.01); *B60W 30/16* (2013.01); *G01S 17/08* (2013.01)

(58) Field of Classification Search
CPC .......... G08G 1/16; G08G 1/20; G01S 13/931; G01S 17/08; G01S 19/42; G01S 17/93; B60W 30/16; G05D 2201/0213; G06K 9/00805; B60Q 9/008
USPC ...... 701/1, 36, 300, 301, 408, 423; 340/435, 340/436, 438, 463, 903, 988
See application file for complete search history.

(56) References Cited

U.S. PATENT DOCUMENTS

| | | | |
|---|---|---|---|
| 7,796,081 B2* | 9/2010 | Breed .................. | B60N 2/2863 340/435 |
| 2008/0147253 A1* | 6/2008 | Breed .................. | B60W 30/16 701/3 |

FOREIGN PATENT DOCUMENTS

JP 2012-238185 A 12/2012

* cited by examiner

*Primary Examiner* — Gertrude Arthur Jeanglaud
(74) *Attorney, Agent, or Firm* — Sughrue Mion, PLLC (57) ABSTRACT

A warning device includes: a host vehicle information acquisition unit; a moving object information acquisition unit that acquires moving object information around the host vehicle; an intersection determination unit that determines whether a course of the host vehicle and a course of the moving object intersect; a distance calculation unit that calculates a distance from the host vehicle to an intersection position; an estimated crossing-time calculation unit that calculates a time that elapses before the moving object arrives at the intersection position; a threshold setting unit; and a warning unit that alerts a driver when the time is smaller than a threshold, wherein the threshold is set larger as the distance becomes larger, and is set larger when the host vehicle speed vehicle is equal to or lower than the predetermined speed than when the host vehicle speed is higher.

6 Claims, 9 Drawing Sheets

| | | INTERSECTION POSITION DISTANCE X | | | |
|---|---|---|---|---|---|
| | | 0<X<Lx1 | Lx1≤X<Lx2 | Lx2≤X<Lx3 | Lx3≤X<Lx4 |
| VEHICLE > PREDETERMINED SPEED | UPPER LIMIT THRESHOLD Tmax | Tmax0 | Tmax1 | Tmax2 | Tmax3 |
| | LOWER LIMIT THRESHOLD Tmin | Tmin0 | Tmin1 | Tmin2 | Tmin3 |
| VEHICLE ≤ PREDETERMINED SPEED & STRAIGHT-AHEAD | UPPER LIMIT THRESHOLD Tmax | Tmax0+α0S | Tmax1+α1S | Tmax2+α2S | Tmax3+α3S |
| | LOWER LIMIT THRESHOLD Tmin | Tmin0+β0S | Tmin1+β1S | Tmin2+β2S | Tmin3+β3S |
| VEHICLE ≤ PREDETERMINED SPEED & RIGHT-TURN | UPPER LIMIT THRESHOLD Tmax | Tmax0+α0R | Tmax1+α1R | Tmax2+α2R | Tmax3+α3R |
| | LOWER LIMIT THRESHOLD Tmin | Tmin0+β0R | Tmin1+β1R | Tmin2+β2R | Tmin3+β3R |
| VEHICLE ≤ PREDETERMINED SPEED & LEFT-TURN | UPPER LIMIT THRESHOLD Tmax | Tmax0+α0L | Tmax1+α1L | NOT APPLICABLE | NOT APPLICABLE |
| | LOWER LIMIT THRESHOLD Tmin | Tmin0+β0L | Tmin1+β1L | NOT APPLICABLE | NOT APPLICABLE |

| | | |
|---|---|---|
| LARGE INTERSECTION | UPPER LIMIT THRESHOLD CORRECTION VALUE | ±0 |
| | LOWER LIMIT THRESHOLD CORRECTION VALUE | ±0 |
| INTERMEDIATE INTERSECTION | UPPER LIMIT THRESHOLD CORRECTION VALUE | +A1 |
| | LOWER LIMIT THRESHOLD CORRECTION VALUE | +B1 |
| SMALL INTERSECTION | UPPER LIMIT THRESHOLD CORRECTION VALUE | +A2 |
| | LOWER LIMIT THRESHOLD CORRECTION VALUE | +B2 |

| | | |
|---|---|---|
| LARGE INTERSECTION | UPPER LIMIT THRESHOLD CORRECTION VALUE | +A3 |
| | LOWER LIMIT THRESHOLD CORRECTION VALUE | +B3 |
| INTERMEDIATE INTERSECTION | UPPER LIMIT THRESHOLD CORRECTION VALUE | +A4 |
| | LOWER LIMIT THRESHOLD CORRECTION VALUE | +B4 |
| SMALL INTERSECTION | UPPER LIMIT THRESHOLD CORRECTION VALUE | +A5 |
| | LOWER LIMIT THRESHOLD CORRECTION VALUE | +B5 |

| | | |
|---|---|---|
| MORNING AND EVENING COMMUTING TIME ZONES | UPPER LIMIT THRESHOLD CORRECTION VALUE | +A6 |
| | LOWER LIMIT THRESHOLD CORRECTION VALUE | +B6 |
| TIME ZONE BETWEEN MORNING AND EVENING COMMUTING TIME ZONES | UPPER LIMIT THRESHOLD CORRECTION VALUE | +A7 |
| | LOWER LIMIT THRESHOLD CORRECTION VALUE | +B7 |
| OTHER TIME ZONE | UPPER LIMIT THRESHOLD CORRECTION VALUE | +A8 |
| | LOWER LIMIT THRESHOLD CORRECTION VALUE | +B8 |

FIG. 9

WARNING DEVICE

INCORPORATION BY REFERENCE

The disclosure of Japanese Patent Application No. 2014-253151 filed on Dec. 15, 2014 including the specification, drawings and abstract is incorporated herein by reference in its entirety.

BACKGROUND OF THE INVENTION

1. Field of the Invention

The present invention relates to a warning device.

2. Description of Related Art

As a conventional warning device, the device disclosed in Japanese Patent Application Publication No. 2012-238185 (JP 2012-238185 A) is known. The warning device described in Japanese Patent Application Publication No. 2012-238185 (JP 2012-238185 A) finds the position of an intersection at which the course of a moving object ahead of a host vehicle intersects with the course of the host vehicle, calculates the estimated crossing-time (ECT: Estimated Crossing_Time) that elapses before the moving object arrives at the intersection position and the estimated crossing-time that elapses before the host vehicle arrives at the intersection position and, based on these estimated crossing-times, outputs a warning to alert the driver of the host vehicle to the moving object. According to such a warning device, the more distant it is from the position of intersection with a moving object to the host vehicle, the earlier the start of warning output is, that is, the warning output is started when the ECT of the moving object is still large.

For example, at an intersection where a priority road (main road) and a non-priority road (narrow road) intersect, the host vehicle, which is going to enter the priority road from the non-priority road, should not disturb the traveling of moving objects such as other vehicles traveling on the priority road. Therefore, it is sometimes necessary to output a warning earlier than at a usual traveling time such as when traveling on a priority road. However, the warning device described above does not consider this requirement, with a possibility that a warning is not output at an appropriate time.

SUMMARY OF THE INVENTION

The present invention provides a warning device that can output a warning at an appropriate time at an intersection.

A first aspect of the invention provides a warning device that includes: a host vehicle information acquisition unit configured to acquire host vehicle information that includes a traveling direction and a vehicle speed of a host vehicle; a moving object information acquisition unit configured to acquire moving object information that includes a position, a moving direction, and a moving speed of a moving object around the host vehicle; an intersection determination unit configured to determine whether a course of the host vehicle and a course of the moving object intersect, based on the host vehicle information and the moving object information; a distance calculation unit configured to calculate an intersection position distance when the intersection determination unit determines that the course of the host vehicle and the course of the moving object intersect, the intersection position distance being a distance from the host vehicle to an intersection position at which the course of the host vehicle and course of the moving object intersect; an estimated crossing-time calculation unit configured to calculate an estimated crossing-time based on the intersection position and the moving object information, the estimated crossing-time being a time that elapses before the moving object arrives at the intersection position; a vehicle speed determination unit configured to determine whether the vehicle speed of the host vehicle is equal to or lower than a pre-set predetermined speed based on the host vehicle information; a threshold setting unit configured to set a threshold based on the intersection position distance and a determination result of the vehicle speed determination unit; and a warning unit configured to output a warning that alerts a driver of the host vehicle to the moving object when the estimated crossing-time is smaller than the threshold. The threshold setting unit is configured to set the threshold larger as the intersection position distance becomes larger, and set the threshold larger when the vehicle speed of the host vehicle is determined equal to or lower than the predetermined speed than when the vehicle speed of the host vehicle is determined higher than the predetermined speed.

In the first aspect, the threshold setting unit may be configured to set the threshold larger when the intersection position distance is equal to or larger than a pre-set specified distance than when the intersection position distance is smaller than the specified distance According to the warning device in the above aspect, a warning is output when the estimated crossing-time (hereinafter called "ECT"), which elapses before a moving object arrives at an intersection position, is smaller than the threshold. This threshold is set larger when the vehicle speed of the host vehicle is determined equal to or lower than the predetermined speed than when the vehicle speed of the host vehicle is not determined equal to or lower than the predetermined speed. By setting the threshold in this manner, the threshold can be set larger at a time of traveling on a non-priority road during which the vehicle speed becomes equal to or lower than the predetermined speed at an intersection than at a usual traveling time such as when traveling on a priority road. As a result, a warning can be output earlier as compared to a usual traveling time. Therefore, a warning can be output at an appropriate time at an intersection.

The first aspect may include a threshold correction unit configured to correct the threshold based on at least one of intersection size information and current time-of-day information. The intersection size information is information on a size of an intersection into which the host vehicle enters. The current time-of-day information is information on a current time-of-day.

A second aspect of the invention provides a warning device including: a host vehicle information acquisition unit configured to acquire host vehicle information that includes a traveling direction and a vehicle speed of a host vehicle; a moving object information acquisition unit configured to acquire moving object information that includes a position, a moving direction, and a moving speed of a moving object around the host vehicle; an intersection determination unit configured to determine whether a course of the host vehicle and a course of the moving object intersect, based on the host vehicle information and the moving object information; a distance calculation unit configured to calculate an intersection position distance when the intersection determination unit determines that the course of the host vehicle and the course of the moving object intersect, the intersection position distance being a distance from the host vehicle to an intersection position at which the course of the host vehicle and course of the moving object intersect; an estimated crossing-time calculation unit configured to calculate an estimated crossing-time based on the intersection position and the moving object information, the estimated crossing-time being a time that elapses before the moving object arrives at the intersection position; a vehicle speed determination unit configured to determine whether the vehicle speed of the host vehicle is equal to or lower than a pre-set predetermined speed based on the host vehicle information; a threshold setting unit configured to set an upper limit threshold and a lower limit threshold based on the intersection position distance and a determination result of the vehicle speed determination unit; and a warning unit configured to output a warning that alerts a driver of the host vehicle to the moving object when the estimated crossing-time is smaller than the upper limit threshold and is larger than the lower limit threshold. The threshold setting unit is configured to set the upper limit threshold and the lower limit threshold larger as the intersection position distance become larger, and set the upper limit threshold and the lower limit threshold larger when the vehicle speed of the host vehicle is determined equal to or lower than the predetermined speed than when the vehicle speed of the host vehicle is determined higher than the predetermined speed.

In the second aspect, the threshold setting unit may be configured to set the upper limit threshold and the lower limit threshold larger when the intersection position distance is equal to or larger than a pre-set specified distance than when the intersection position distance is smaller than the specified distance.

According to the warning device in the above aspect, too, the upper limit threshold and the lower limit threshold can be set larger at a time of traveling on a non-priority road during which the vehicle speed becomes equal to or lower than the predetermined speed at an intersection than at a usual traveling time such as when traveling on a priority road. As a result, a warning can be output earlier as compared to a usual traveling time. Therefore, a warning can be output at an appropriate time at an intersection.

The second aspect may include a threshold correction unit configured to correct the upper limit threshold and the lower limit threshold based on at least one of intersection size information and current time-of-day information, the intersection size information being information on a size of an intersection into which the host vehicle enters, the current time-of-day information being information on a current time-of-day.

According to the warning device in the aspect of the present invention, a warning device can be provided that can output a warning at an appropriate time at an intersection.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the present invention are described in detail below with reference to the drawings. In the description below, the same reference numeral is used for the same or equivalent component and the duplicated description is omitted.

Figure 1:
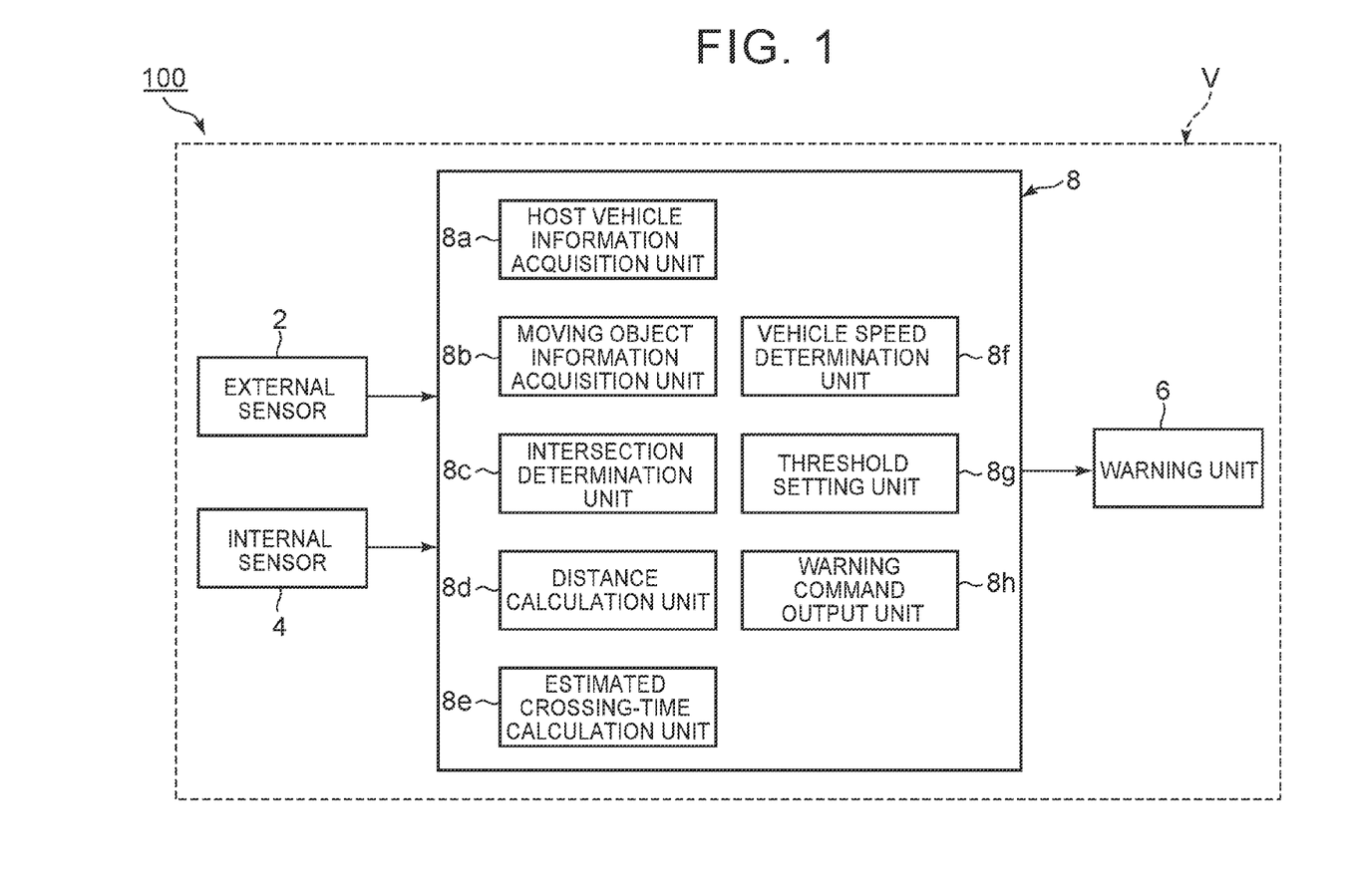
FIG. 1 is a block diagram showing a configuration of a warning device in a first embodiment.
Figure 2A:
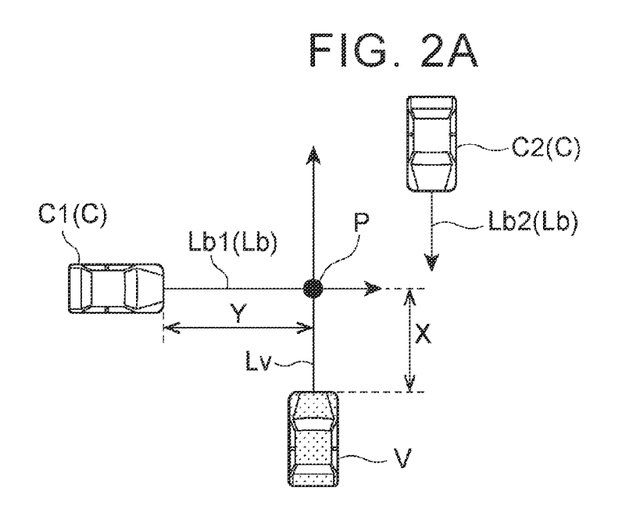
FIG. 2A is a bird's-eye view showing a case in which the course of a host vehicle and the course of a moving object intersect.
Figure 2B:
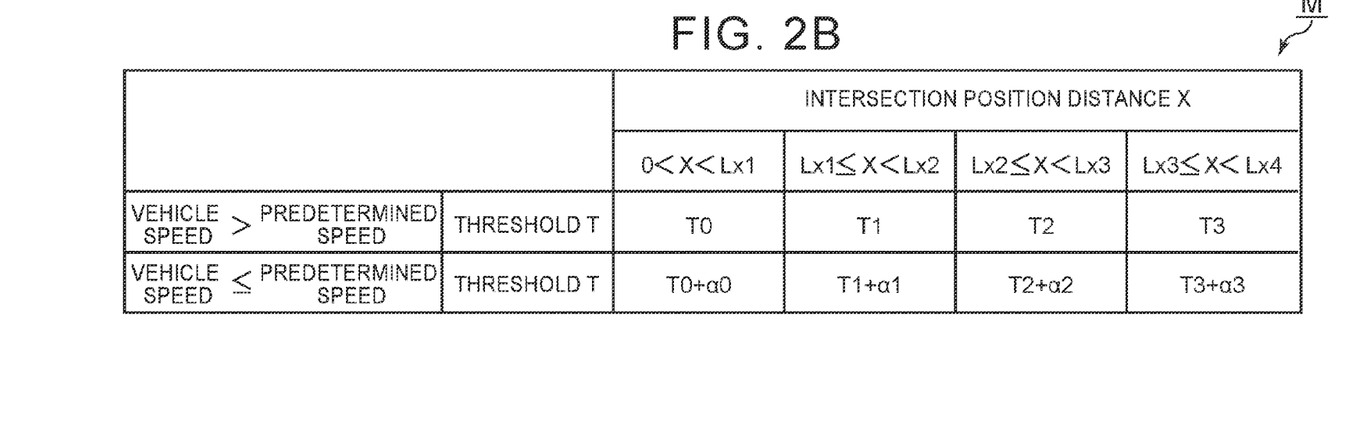
FIG. 2B is a diagram showing an example of a map provided in a threshold setting unit of the warning device shown in FIG. 1.

FIG. 1 is a block diagram showing a configuration of a warning device in a first embodiment. FIG. 2A is a bird's-eye view showing a case in which the course of a host vehicle and the course of a moving object intersect. FIG. 2B is a diagram showing an example of a map provided in a threshold setting unit of the warning device shown in FIG. 1. As shown in FIG. 1, a warning device 100 is mounted in a host vehicle V such as a car. The warning device 100 includes an external sensor 2, an internal sensor 4, a warning unit 6, and an Electronic Control Unit (ECU) 8.

The external sensor 2 is a detection apparatus that detects the surrounding information on the host vehicle V. The external sensor 2 includes at least one of a camera, a radar [Radar], and a Laser Imaging Detection and Ranging (LIDER). The camera is a capturing apparatus that captures the external situation of the host vehicle V. The camera sends the captured information on the external situation of the host vehicle V to the ECU 8. The camera may be a monocular camera or a stereo camera. The stereo camera includes two capturing units arranged so that the disparity between the right eye and the left eye can be reproduced. The information captured by the stereo camera also includes the depth information.

The radar detects an obstacle around the host vehicle V using a radio wave (for example, millimeter wave). The obstacle includes a moving object that is a movable object such as other vehicles, pedestrians, animals, or bicycles. The radar detects an object by sending a radio wave to the surroundings of the host vehicle V and receiving the radio wave reflected by an obstacle. The radar sends the detected obstacle information to the ECU 8. The LIDER detects an obstacle outside the host vehicle V using light. The LIDER measures the distance to a reflection point and detects an obstacle by sending light to the surroundings of the host vehicle V and receiving light reflected by the obstacle. The LIDER sends the detected obstacle information to the ECU 8.

The internal sensor 4 is a detection apparatus that detects the traveling state of the host vehicle V. The internal sensor 4 includes a vehicle speed sensor and a yaw rate sensor. The vehicle speed sensor is a detection apparatus that detects the speed of the host vehicle V. An example of the vehicle speed sensor is a wheel speed sensor that is provided on the wheels of the host vehicle V or on the drive shaft, which rotates in synchronization of the wheels, to detect the rotation speed of the wheels. The vehicle speed sensor sends the detected vehicle speed information (wheel speed information) to the ECU 8. The yaw rate sensor is a detection apparatus that detects the yaw rate (turning angle velocity) around the vertical axis at the center of gravity of the host vehicle V. For example, a gyro sensor may be used as the yaw rate sensor. The yaw rate sensor sends the detected yaw rate information on the host vehicle V to the ECU 8.

The warning unit 6 alerts the driver to the presence of a moving object around the host vehicle V. The warning unit 6 includes at least one of a display that displays image information to the occupants (including driver) and a speaker that outputs a sound. In response to a warning command input from the ECU 8, the warning unit 6 performs at least one of the display of a caution display onto the display panel and the output of a sound, such as a buzzer sound, from the speaker.

The ECU 8 is an electronic control unit that includes a Central Processing Unit (CPU), a Read Only Memory (ROM), and a Random Access Memory (RAM). The ECU 8 loads a program, stored in the ROM, into the RAM for execution by the CPU to perform various types of control operations. The ECU 8 may be configured by a plurality of electronic control units.

The ECU 8 includes a host vehicle information acquisition unit 8a, a moving object information acquisition unit 8b, an intersection determination unit 8c, a distance calculation unit 8d, an estimated crossing-time calculation unit 8e, a vehicle speed determination unit 8f, a threshold setting unit 8g, and a warning command output unit 8h.

The host vehicle information acquisition unit 8a acquires host vehicle information based on the traveling state of the host vehicle V that is detected by the internal sensor 4. The host vehicle information, the information on the traveling state of the host vehicle V, includes at least the traveling direction (direction in which the host vehicle V faces) and the vehicle speed of the host vehicle V. The moving object information acquisition unit 8b acquires moving object information based on the surrounding information on the host vehicle V that is detected by the external sensor 2. The moving object information, the information on the traveling state of a moving object around the host vehicle V, includes at least the position, moving direction (direction in which the moving object faces), and moving speed of the moving object. The position of a moving object can be acquired as the positions of the x-coordinate and y-coordinate in the coordinate system with the origin at the host vehicle V or as the equivalent positional information relative to the position of the host vehicle V (the intersection position that will be described later is acquired in the same manner). In this embodiment, the representation method for a position is not limited to a specific method but a known method may be used.

The intersection determination unit 8c determines whether the course of the host vehicle V and the course of a moving object intersect, based on the host vehicle information and the moving object information. For example, as shown in FIG. 2A, the intersection determination unit 8c predicts the locus, in which the host vehicle V will travel in the traveling direction of the host vehicle V at the vehicle speed of the host vehicle V for a certain time, as the course Lv of the host vehicle V. Similarly, the intersection determination unit 8c predicts the locus, in which the moving object C will travel in the traveling direction of the moving object C at the moving speed of the moving object C for a certain time, as the course Lb of the moving object C. In the example shown in the figure, the course Lb1 of a moving object C1 and the course Lv of the host vehicle V overlap at the intersection position P. In this case, the intersection determination unit 8c determines that the course Lb1 and the course Lv intersect. On the other hand, the course Lb2 of a moving object C2 does not overlap with the course Lv of the host vehicle. In this case, the intersection determination unit 8c determines that the course Lb2 and the course Lv do not intersect. Whether the course of the host vehicle V and the course of the moving object C intersect may be determined by a method other than that described above. The method is not limited to a specific method but any known method may be used.

If the intersection determination unit 8c determines that the course Lv of the host vehicle V and the course Lb1 of the moving object C1 intersect as shown in FIG. 1 and FIG. 2A, the distance calculation unit 8d calculates the intersection position distance X that is the distance from the host vehicle V to the intersection position P. More specifically, the distance calculation unit 8d calculates the position, at which the predicted courses, Lv and Lb1, intersect, as the intersection position P and calculates the distance from the front end of the host vehicle V to the intersection position P as the intersection position distance X.

The estimated crossing-time calculation unit 8e calculates the ECT that is the estimated crossing-time that elapses before the moving object C1 arrives at the intersection position P, based on the moving object information and the intersection position P. ECT may be regarded as the estimated crossing-time that elapses from the moment that the estimated crossing-time calculation unit 8e calculates the ECT to the moment that the moving object C1 arrives at the intersection position P. The estimated crossing-time calculation unit 8e calculates the ECT by dividing the distance Y, from the front end of the moving object C1 to the intersection position P, by the moving speed (vehicle speed) of the moving object C1.

The vehicle speed determination unit 8f determines whether the vehicle speed of the host vehicle V is equal to or lower than a predetermined speed that is set in advance, based on the host vehicle information. The predetermined speed refers to a speed with which it can be determined whether the host vehicle V, which approaches an intersection, is traveling on a non-priority road or a priority road. The predetermined time is, for example, a low vehicle speed equal to or lower than 10 km/h. The predetermined speed, though not limited to a particular vehicle speed, is set, empirically or generally, to a value of 10 km/h, because a stop sign is usually installed at the exit of a non-priority road at an intersection.

The threshold setting unit 8g sets a threshold based on the intersection position distance X and on the determination result of the vehicle speed determination unit 8f. The threshold is a value indicating whether to output a warning command from the warning command output unit 8h. In the warning command output unit 8h, the threshold is compared with the ECT. The threshold is a time-based value. The threshold setting unit 8g sets the threshold, used when the intersection position distance X is equal to or larger than the pre-set specified distance, larger than the threshold used when the intersection position distance X is smaller than the specified distance. In addition, the threshold setting unit 8g sets the threshold, used when the vehicle speed of the host vehicle V is determined equal to or lower than the predetermined speed, larger than the threshold used when the vehicle speed of the host vehicle V is determined higher than the predetermined speed.

The threshold setting unit 8g has a map M as shown in FIG. 2B, and references this map M to set the threshold T based on the intersection position distance X and the vehicle speed of the host vehicle V. In the map M in the FIG. 2B, $T0<T1<T2<T3$ and $\alpha 0 \leq \alpha 1 \leq \alpha 2 \leq \alpha 3$. According to the map M, the threshold T is set larger in a stepwise manner in the following range order of the intersection position distance X: the range larger than 0 and smaller than the specified distance Lx1, the range equal to or larger than the specified distance Lx1 and smaller than the specified distance Lx2, the range equal to or larger than the specified distance Lx2 and smaller than the specified distance Lx3, and the range equal to or larger than the specified distance Lx3 and smaller than the specified distance Lx4. For the same intersection position distance X, the threshold T is set larger when the vehicle speed of the host vehicle V is equal to or lower than the predetermined speed than when the vehicle speed of the host vehicle V is higher than the predetermined speed.

Using the map M described above, the threshold setting unit 8g sets the threshold T as follows. That is, the threshold T is set larger when the intersection position distance X is equal to or larger than the specified distance Lx1 than when the intersection position distance is smaller than the specified distance Lx1. The threshold T is set larger when the intersection position distance X is equal to or larger than the specified distance Lx2 than when the intersection position distance is smaller than specified distance Lx2. The threshold T is set larger when the intersection position distance X is equal to or larger than the specified distance Lx3 than when the intersection position distance is smaller than the specified distance Lx3. In addition, the threshold T is set larger when the vehicle speed of the host vehicle V is determined by the vehicle speed determination unit 8f as equal to or lower than the predetermined speed, than when the vehicle speed of the host vehicle V is determined by the vehicle speed determination unit 8f as higher than the predetermined speed.

When the intersection position distance X is equal to or larger than Lx4, the warning unit 6 does not perform the warning support and therefore the threshold setting unit 8g sets the threshold T, for example, to a negative value. The threshold setting unit 8g may have two maps: one for use when the vehicle speed is equal to or lower than the predetermined speed and the other for use when the vehicle speed is higher than the predetermined speed. In this case, the threshold setting unit 8g may set the threshold T by selectively referencing these two maps according to the determination result of the vehicle speed determination unit 8f.

When the ECT calculated by the estimated crossing-time calculation unit 8e is smaller than the threshold T, the warning command output unit 8h outputs a warning command that causes the warning unit 6 to output a warning.

Figure 3:
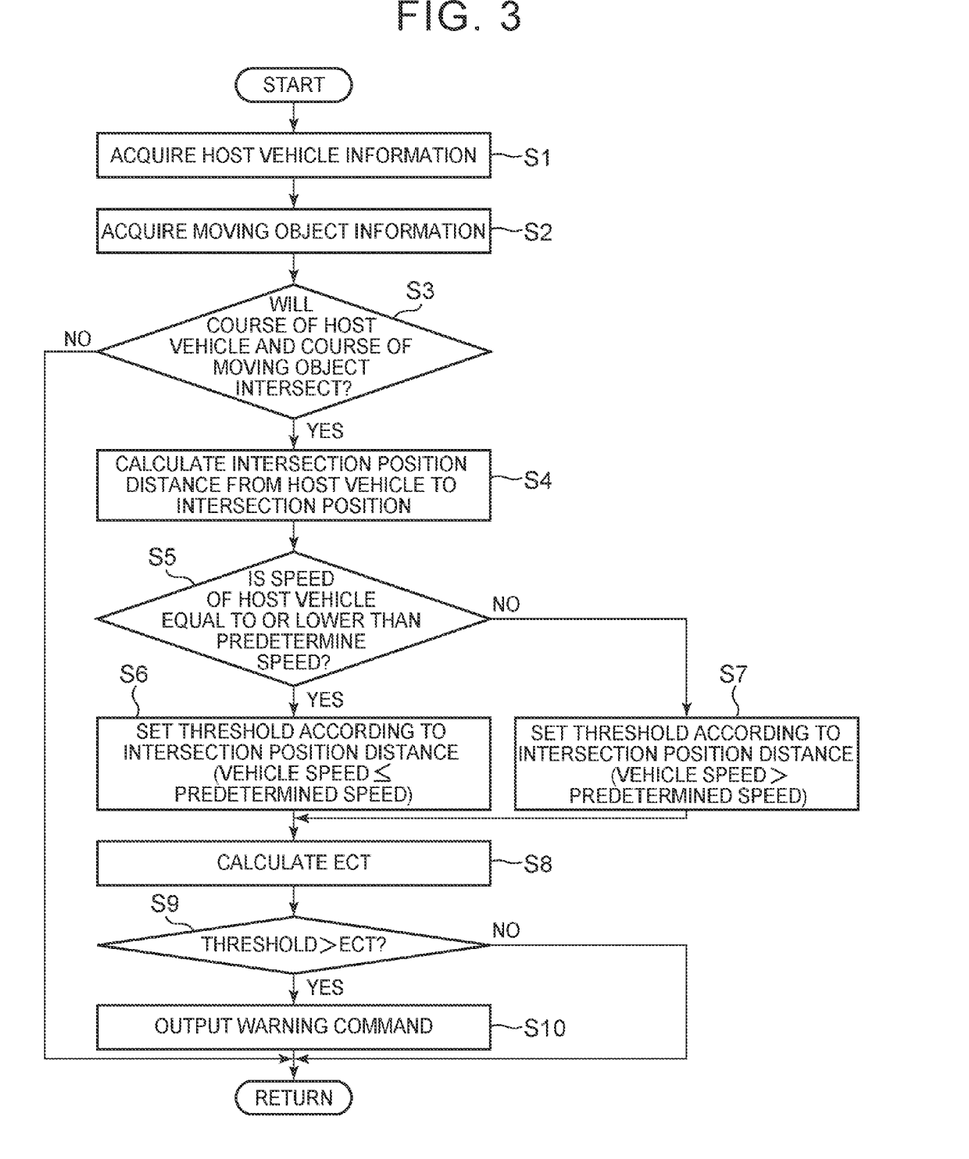
FIG. 3 is a flowchart showing the warning processing in the warning device shown in FIG. 1.

Next, the processing performed by the warning device 100 is described more in detail below with reference to the flowchart shown in FIG. 3. FIG. 3 is a flowchart showing the warning processing of the warning device 100. As shown in FIG. 3, the warning device 100 performs the following warning processing in the ECU 8 repeatedly at a predetermined periodic processing interval.

First, the host vehicle information acquisition unit 8a acquires the host vehicle information, which includes the traveling direction and vehicle speed of the host vehicle V, from the detection result of the internal sensor 4 (S1). The moving object information acquisition unit 8b acquires the moving object information, which includes the position, traveling direction, and moving speed of the moving object C, from the detection result of the external sensor 2 (S2). The intersection determination unit 8c determines whether the course Lv of the host vehicle V and the course Lb of the moving object C intersect, based on the acquired host vehicle information and moving object information (S3).

If the course Lv of the host vehicle V do not intersect with the course Lb of the moving object C (for example, the course Lv and the course Lb2 shown in FIG. 2A), the warning processing in this cycle is terminated immediately and the processing proceeds to the warning processing in the next cycle. On the other hand, if the course Lv of the host vehicle V intersects with the course Lb of the moving object C (for example, the course Lv and the course Lb1 shown in FIG. 2A), the distance calculation unit 8d calculates the intersection position distance X as the distance from the host vehicle V to the intersection position P (S4). After that, the vehicle speed determination unit 8f determines whether the vehicle speed of the host vehicle V is equal to or lower than the predetermine speed based on the host vehicle information (S5).

If the vehicle speed of the host vehicle V is equal to or lower than the predetermined speed, the threshold setting unit 8g sets a value stored in the map M, which corresponds to the vehicle speed equal to or lower than the predetermined speed and which is in the corresponding intersection position range X, as the threshold T (S6). On the other hand, if the vehicle speed of the host vehicle V is higher than the predetermined speed, the threshold setting unit 8g sets a value stored in the map M, which corresponds to the vehicle speed higher than the predetermined speed and which is in the corresponding intersection position range X, as the threshold T (S7).

After S6 and S7 described above, the estimated crossing-time calculation unit 8e calculates the ECT based on the moving object information and the intersection position P (S8). If the calculated ECT is smaller than the threshold, the warning command output unit 8h outputs a warning command that causes the warning unit 6 to output a warning (S9, S10). As a result, the warning unit 6 outputs a warning in response to the input of the warning command. If the calculated ECT is equal to or larger than the threshold, the warning processing in this cycle is terminated immediately and the processing proceeds to the warning processing in the next cycle.

By the way, it should be noted that, when entering an intersection from a non-priority road, there are many moving objects C to which attention must be paid. Therefore, as compared to traveling on a priority road, more consideration is required for confirming safety, for example, the vehicle must reduce the speed or wait for other vehicles to pass. Because of this, it is preferable that a warning be output as early as possible. In addition, to avoid disturbing the traveling of moving objects C such as other vehicles traveling on a priority road, it is preferable that a warning be output earlier when the host vehicle V is traveling on a non-priority road than when the host vehicle V is traveling on a priority road.

Usually, a stop sign is installed at the exit of a non-priority road at an intersection. In this case, a repeated traveling pattern of the host vehicle V, which is traveling on a non-priority road and is going to enter an intersection, is that the host vehicle V once reduces the speed and stops (or travels slowly) at the intersection and then increases the speed. From this traveling pattern, it is estimated that, in many cases, the vehicle speed of the host vehicle becomes equal to or lower than the predetermined speed before entering a priority road.

With this in mind, the warning device 100 in this embodiment outputs a warning if the ECT is smaller than the threshold and, as described above, this threshold T is set larger when the vehicle speed of the host vehicle V is determined equal to or lower than the predetermined speed than when the vehicle speed of the host vehicle V is determined higher than the predetermined speed. By setting the threshold T in this manner, the threshold T can be set larger at a time of traveling on a non-priority road during which the vehicle speed becomes equal to or lower than the predetermined speed at an intersection than at a usual traveling time such as when traveling on a priority road. As a result, a warning can be output earlier as compared to a usual traveling time such as when traveling on a priority road. Therefore, a warning can be output at an appropriate time at an intersection.

Figure 4:
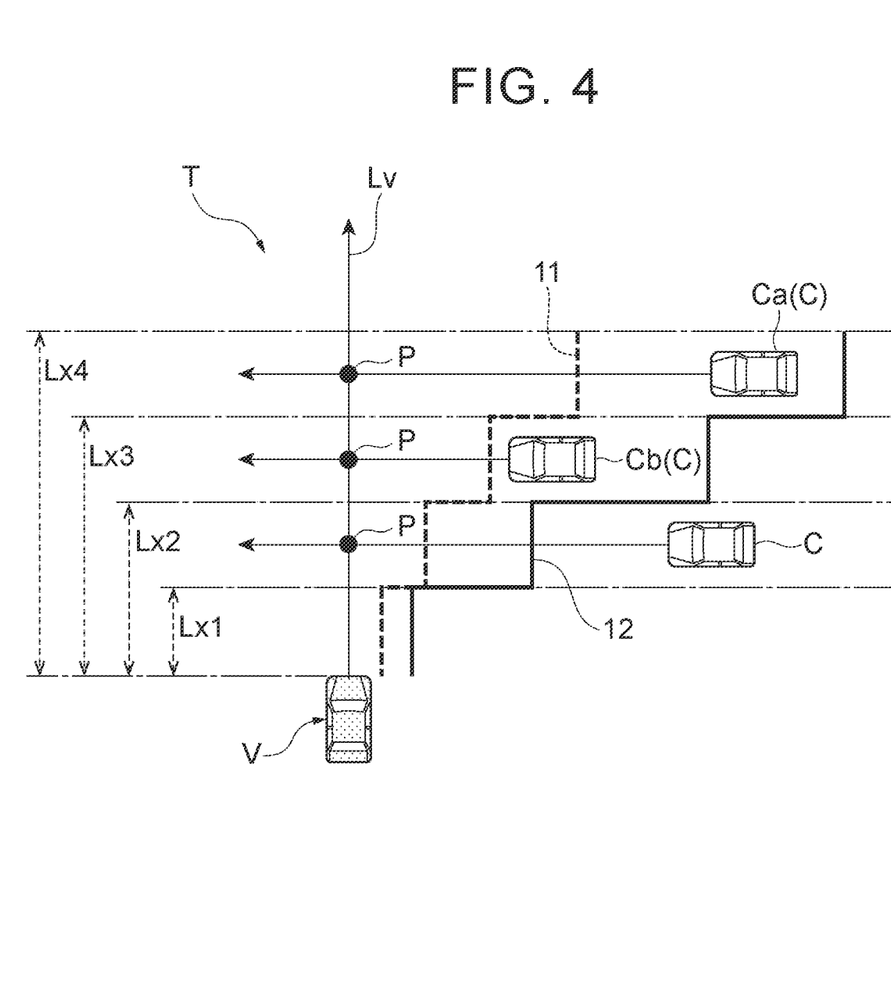
FIG. 4 is a bird's-eye view showing a timing at which a warning is output from the warning device shown in FIG. 1.

FIG. 4 is a bird's-eye view showing a timing at which a warning is output from the warning device 100 shown in FIG. 1. As shown in FIG. 4, when the host vehicle V is traveling on a priority road near an intersection, the vehicle speed of the host vehicle V is determined higher than the predetermined speed and, therefore, the threshold T is set smaller than when the vehicle speed is equal to or lower than the predetermined speed. As a result, a warning is output when there is a moving object C in the range nearer to the intersection position P than a line 11 shown in FIG. 4. On the other hand, when the host vehicle V is traveling on a non-priority road near an intersection, the vehicle speed of the host vehicle V is determined equal to or lower than the predetermined speed and, therefore, the threshold T is set larger than when the vehicle speed is higher than the predetermined speed. As a result, a warning is output when there is a moving object C in the range nearer to the intersection position P than a line 12 shown in FIG. 4. Therefore, when traveling on a non-priority road, a warning about the moving objects Ca and Cb, to which a warning is not output when traveling on a priority road, is output, meaning that a warning can be output earlier (from the time the ECTs of the moving objects Ca and Cb are still large) than when traveling on a priority road.

The warning device 100 in this embodiment outputs a warning not based on the Time To Collision (TTC) that elapses before the host vehicle V arrives at the intersection position P. Therefore, the warning device 100 can reduce the possibility of an erroneous warning output that could be caused because the TTC cannot be calculated accurately due to the above-described traveling pattern specific to traveling on a non-priority road. During usual traveling on a priority road where the vehicle speed at an intersection is higher than the predetermined speed, the warning device 100 in this embodiment outputs a warning later than the time at which a warning would be output on a non-priority road. This reduces the output of warnings about a moving object C with which the host vehicle is less likely to collide, thus avoiding inconvenience of receiving unnecessary warnings.

Although the threshold T is set larger in this embodiment based on the determination condition whether the vehicle speed of the host vehicle V is equal to or lower than the predetermined speed (see S5 described above), the present invention is not limited to this method. For example, the configuration of a first modification described below may also be used. That is, the internal sensor 4 further includes at least one of a brake pedal sensor and an accelerator pedal sensor, and the host vehicle information acquisition unit 8$a$ acquires the host vehicle information, which further includes the information on at least one of the brake operation and the accelerator operation, from the detection result of the internal sensor 4. Based on the host vehicle information, the vehicle speed determination unit 8$f$ determines whether at least one of the following conditions is satisfied: that is, whether the vehicle speed is equal to or lower than the predetermined speed and the brake is operated, whether the vehicle speed is reduced to the speed equal to or lower than the predetermined speed and then the accelerator is operated, whether the vehicle speed is reduced to the speed equal to or lower than the predetermined speed and then the vehicle speed is set to the speed equal to or higher than a certain pre-set vehicle speed, and whether the action of reducing the vehicle speed to the speed equal to or lower than the predetermined speed and then increasing the speed is repeated a certain number of times or more within a certain time. If the result of this determination is "Yes", the vehicle speed determination unit 8$f$ may set the threshold T larger as compared to the case in which the result of the determination is "No".

In place of or in addition to this embodiment or the first modification described above, the configuration of a second modification described below may also be used. That is, based on the host vehicle information and the moving object information, the vehicle speed determination unit 8$f$ determines whether the vehicle speed is equal to or lower than the predetermined speed and whether there is a moving object C. If the result of this determination is "Yes", the vehicle speed determination unit 8$f$ may set the threshold T larger as compared to the case in which the result of the determination is "No".

The configuration of a third modification described below may also be used in place of or in addition to this embodiment, the first modification described above, and the second modification described above. That is, the ECU 8 further includes a surrounding environment information acquisition unit and, based on the detection result of the external sensor 2, the surrounding environment information acquisition unit acquires the surrounding environment information that includes information on at least one of whether there is a traffic light ahead of the host vehicle V, whether there is a stop sign, and whether there is a blocking object to a side of the host vehicle V. Based on the host vehicle information and the surrounding environment information, the vehicle speed determination unit 8$f$ determines whether it is estimated that the vehicle speed is equal to or lower than the predetermined speed and that the host vehicle V enters an intersection. If the result of this determination is "Yes", the vehicle speed determination unit 8$f$ may set the threshold T larger as compared to the case in which the result of the determination is "No".

At least one of the other-vehicle information and the surrounding environment information described above may also be acquired based on the information obtained from at least one of the vehicle-vehicle communication, the road-vehicle communication, and the navigation system in place of or in addition to the detection result of the external sensor 2.

Figure 5A:
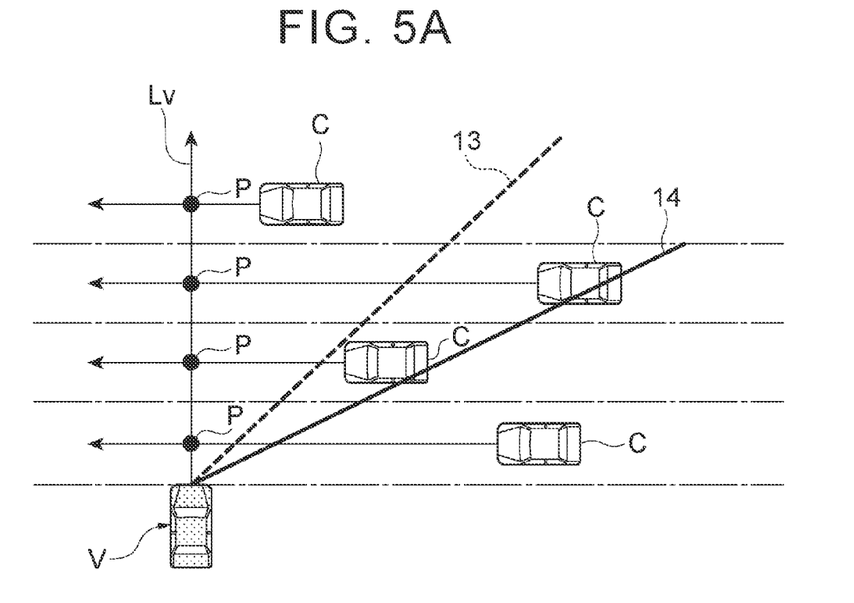
FIG. 5A is a bird's-eye view showing another example of a timing at which a warning is output from the warning device shown in FIG. 1.

FIG. 5A is a bird's-eye view showing another example of a timing at which a warning is output from the warning device 100 shown in FIG. 1. The threshold setting unit 8g uses the map M to increase the threshold T in a stepwise manner as the intersection position distance X is larger. Instead of this, the threshold setting unit 8g may increase the threshold T in proportion to the intersection position distance X. This threshold setting unit 8g increases the threshold T in proportion to the intersection position distance X according to the proportional relation in which the proportionality constant is set larger when the vehicle speed of the host vehicle V is equal to or lower than the predetermined speed than when the vehicle speed of the host vehicle V is larger than the predetermined speed.

In this case, when the vehicle speed of the host vehicle V is higher than the predetermined speed, a warning is output if there is a moving object C in the range on the side nearer to the intersection position P than a line 13 shown in FIG. 5A. On the other hand, when the vehicle speed of the host vehicle V is equal to or lower than the predetermined speed, a warning is output if there is a moving object C in the range on the side nearer to the intersection position P than a line 14 shown in FIG. 5A.

The threshold setting unit 8g may set the threshold T to a constant value when the intersection position distance X is smaller than a pre-set predetermined distance and may increase the threshold T in proportion to the intersection position distance X when the intersection position distance X is equal to or larger than the predetermined distance. The threshold T that is increased in proportion to the intersection position distance X is considered to have a value that is larger when the intersection position distance X is equal to or larger than the pre-set specified distance than when the intersection position distance X is smaller than the specified distance.

Figure 5B:
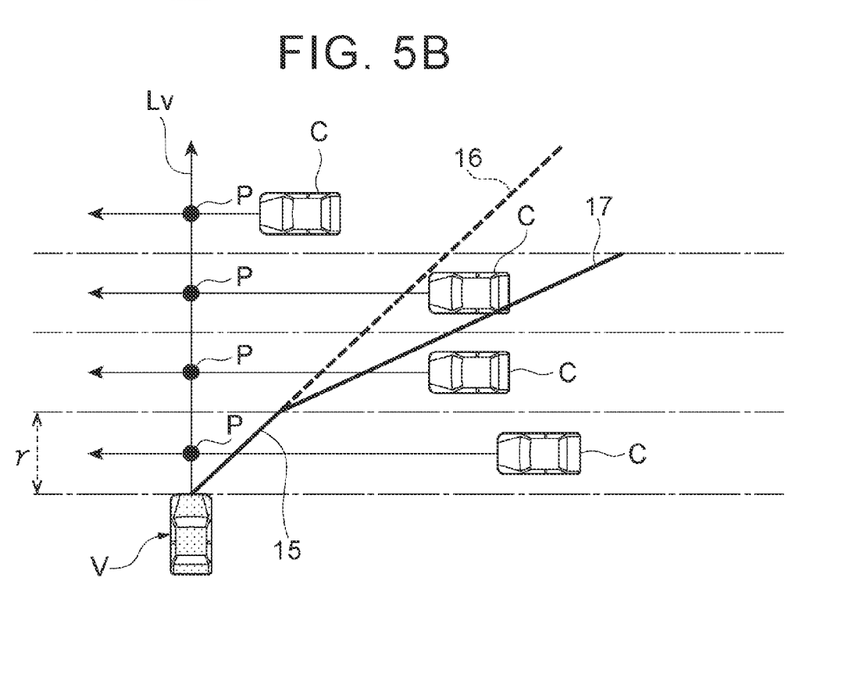
FIG. 5B is a bird's-eye view showing still another example of a timing at which a warning is output from the warning device shown in FIG. 1.

FIG. 5B is a bird's-eye view showing still another example of a timing at which a warning is output from the warning device shown in FIG. 1. In the description above, the threshold setting unit 8g uses the map M to set the threshold T so that the threshold T is increased stepwise as the intersection position distance X is larger. Instead of this, the threshold setting unit 8g may set the threshold T as follows.

That is, the threshold setting unit 8g increases the threshold T in proportion to the intersection position distance X and, at the same time, when the intersection position distance X is equal to or larger than a certain pre-set distance y, increases the threshold T in proportion to the intersection position distance X according to the proportional relation in which the proportionality constant is set larger when the vehicle speed of the host vehicle V is equal to or lower than the predetermined speed than when the vehicle speed of the host vehicle V is larger than the predetermined speed.

In this case, when the intersection position distance X is smaller than a certain distance, a warning is output if there is a moving object C in the range on the side nearer to the intersection position P than a line 15 shown in FIG. 5B. When the intersection position distance X is equal to or larger than a certain distance and when the vehicle speed of the host vehicle V is higher than the predetermined speed, a warning is output if there is a moving object C in the range on the side nearer to the intersection position P than a line 16 shown in FIG. 5B. When the intersection position distance X is equal to or larger than a certain distance and when the vehicle speed of the host vehicle V is equal to or lower than the predetermined speed, a warning is output if there is a moving object C in the range on the side nearer to the intersection position P than a line 17 shown in FIG. 5B.

Next, a second embodiment is described. In the description of this embodiment, only the part different from that in the first embodiment is described and redundant description is omitted.

Figure 6:
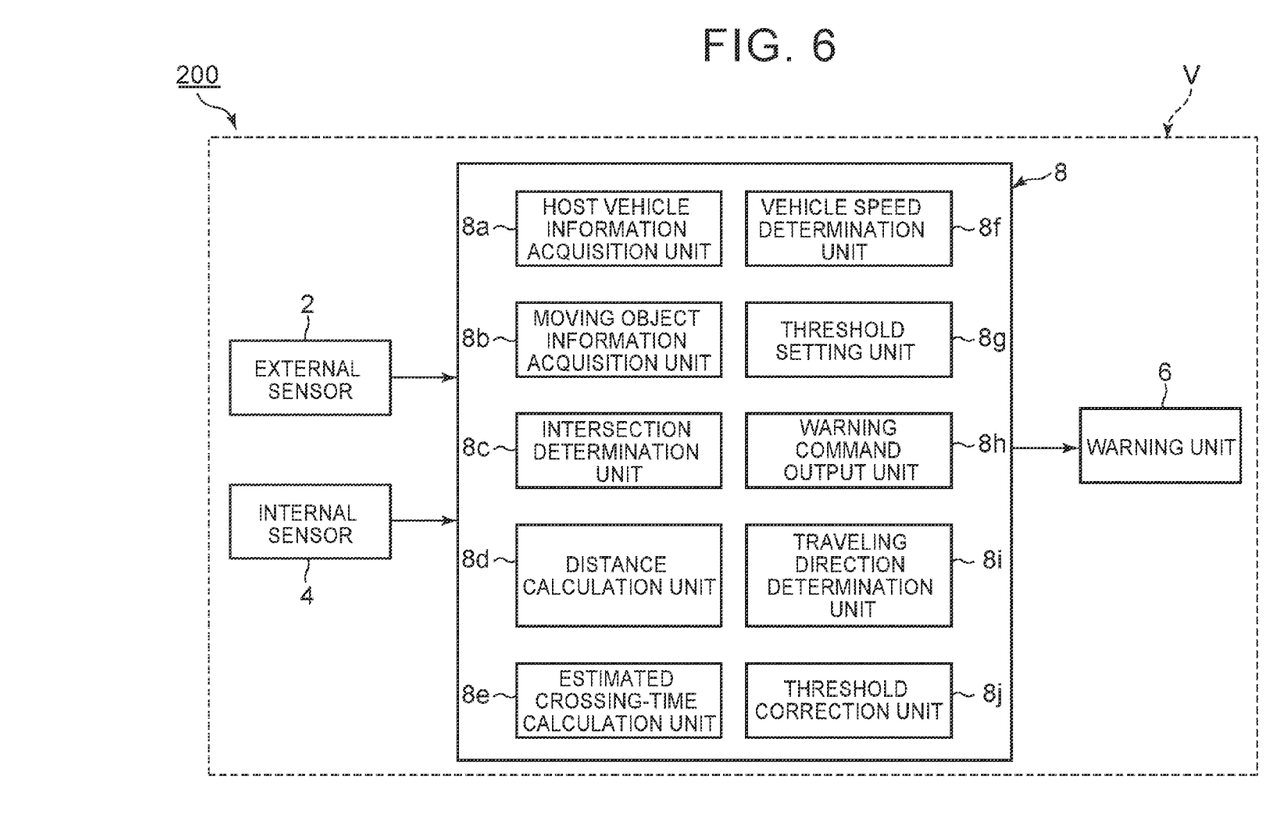
FIG. 6 is a block diagram showing a configuration of a warning device in a second embodiment.
Figure 7:
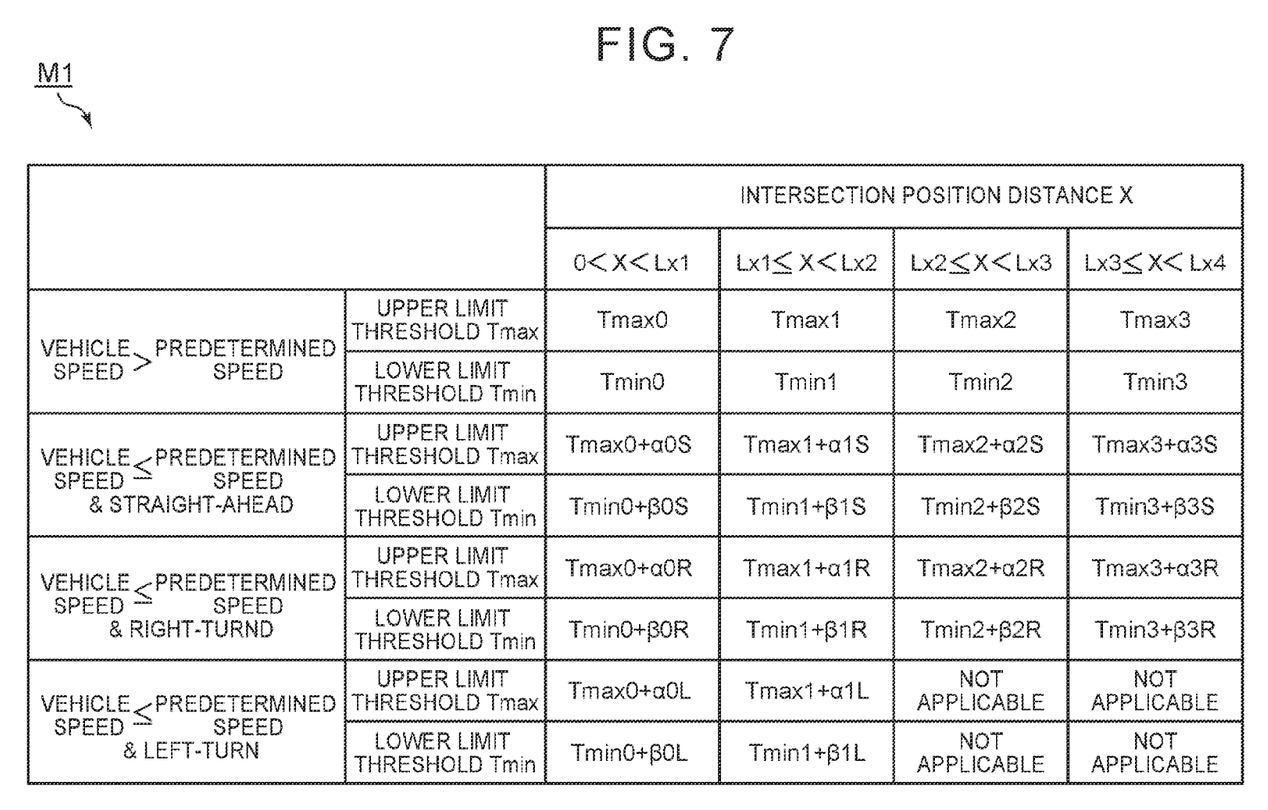
FIG. 7 is a diagram showing an example of a map provided in a threshold setting unit of the warning device shown in FIG. 6.

FIG. 6 is a block diagram showing a configuration of a warning device in the second embodiment. FIG. 7 is a diagram showing an example of a map provided in a threshold setting unit of the warning device shown in FIG. 6. As shown in FIG. 6, in a warning device 200 in this embodiment, the ECU 8 further includes a traveling direction determination unit 8i and a threshold correction unit 8j.

The internal sensor 4 further includes a blinker sensor that detects a driver's operation on the blinker operation unit (such as a blinker lever) of the host vehicle V. The host vehicle information acquisition unit 8a acquires the host vehicle information, which further includes the blinker on/off information (for example, the information on one of the off state, right blinker on state, and left blinker on state), from the detection result of the internal sensor 4.

The traveling direction determination unit 8i determines whether the host vehicle V travels straight ahead, turn left, or turn right, based on the host vehicle information. The threshold setting unit 8g sets an upper limit threshold and a lower limit threshold, which are the equivalents of the threshold T described above, based on the intersection position distance X, determination result of the vehicle speed determination unit 8f, and the determination result of the traveling direction determination unit 8i. The upper limit threshold and the lower limit threshold are values related to whether to output a warning command from the warning command output unit 8h. The upper limit threshold and the lower limit threshold are the values that are compared with the ECT in the warning command output unit 8h. The upper limit threshold and the lower limit threshold are each a time-based value with the upper limit threshold larger than the lower threshold in value.

The threshold setting unit 8g sets the upper limit threshold and the lower limit threshold, used when the intersection position distance X is equal to or larger than the pre-set specified distance, larger than the upper limit threshold and the lower limit threshold used when the intersection position distance X is smaller than the specified distance. In addition, the threshold setting unit 8g sets the upper limit threshold and the lower limit threshold, used when the vehicle speed of the host vehicle V is determined equal to or lower than the predetermined speed, larger than the upper limit threshold and the lower limit threshold used when the vehicle speed of the host vehicle V is determined higher than the predetermined speed.

Because the time required for changing the traveling direction depends on the direction in which to turn, the threshold setting unit 8g changes the upper limit threshold and the lower limit threshold according to the traveling direction. More specifically, the threshold setting unit 8g sets the upper limit threshold and the lower limit threshold, used when the host vehicle V is determined to turn left, larger than the upper limit threshold and the lower limit threshold used when the host vehicle V is determined to travel straight ahead. In addition, the threshold setting unit 8g sets the upper limit threshold and the lower limit threshold, used when the host vehicle V is determined to turn right, larger than the upper limit threshold and the lower limit threshold used when the host vehicle V is determined to turn left.

The threshold setting unit 8g, which has a map M1 as exemplified in FIG. 7, references this map M1 to set the upper limit threshold Tmax and the lower limit threshold Tmin, based on the intersection position distance X, the vehicle speed of the host vehicle V, and the traveling direction of the host vehicle V.

In the map M1 in the figure, Tmax0<Tmax1<Tmax2<Tmax3 and Tmin0<Tmin1<Tmin2<Tmin3. Similarly, α0S≤α1S≤α2S≤α3S and β0S≤β1S≤β2S≤β3S. Similarly, α0R≤α1R≤α2R≤α3R and β0R≤β1R≤β2R≤β3R. Similarly, α0L≤α1L≤α2L≤α3L and β0L≤β1L≤β2L≤β3L.

In addition, in the map M0, α0S≤α0L≤α0R, β0S≤β0L≤β0R, α1S≤α1L≤α1R, β1S≤β1L≤β1R, α2S≤α2R, β2S≤β2R, α3S≤α3R, and β3S≤β3R. In the map M1, in the range in which the intersection position distance X is equal to or larger than the specified distance Lx2 and is smaller than the specified distance Lx3 and in the range in which the intersection position distance X is equal to or larger than the specified distance Lx3 and is smaller than the specified distance Lx4, the warning unit 6 does not provide the warning support if the host vehicle V turns left. For example, the upper limit threshold Tmax and the lower limit threshold Tmin each has a negative value. By not providing the warning support in this manner, the amount of information on a warning about an object, with which the vehicle is less likely to collide when it turns left, can be reduced.

Therefore, the threshold setting unit 8g sets the upper limit threshold Tmax and the lower limit threshold Tmin as follows. That is, the upper limit threshold Tmax and the lower limit threshold Tmin are set larger when the intersection position distance X is equal to or larger than the specified distance Lx1 than when the intersection position distance is smaller than the specified distance Lx1. The upper limit threshold Tmax and the lower limit threshold Tmin are set larger when the intersection position distance X is equal to or larger than the specified distance Lx2 than when the intersection position distance is smaller than the specified distance Lx2. The upper limit threshold Tmax and the lower limit threshold Tmin are set larger when the intersection position distance X is equal to or larger than the specified distance Lx3 than when the intersection position distance is smaller than the specified distance Lx3.

In addition, the upper limit threshold Tmax and the lower limit threshold Tmin are set larger when the vehicle speed of the host vehicle V is determined equal to or lower than the predetermined speed than when the vehicle speed of the host vehicle V is determined higher than the predetermined speed. When the vehicle speed of the host vehicle V is determined equal to or lower than the predetermined speed, the upper limit threshold Tmax and the lower limit threshold Tmin are set larger when the host vehicle V turns left than when the host vehicle V travels straight ahead and are set larger when the host vehicle V turns right than when the host vehicle V turns left.

The threshold correction unit 8j acquires the intersection size information about the size of the intersection, into which the host vehicle V enters, from the detection result of the external sensor 2. The threshold correction unit 8j corrects the upper limit threshold Tmax and the lower limit threshold Tmin, which are set by the threshold setting unit 8g, based on the acquired intersection size information. The intersection size information is the information indicating one of the following intersection sizes: "large" indicating that the intersection size is large, "small" indicating that the intersection size is small, and "intermediate" indicating that the intersection size is between "large" and "small". An intersection with the intersection size of "small" is an intersection with no centerline. An intersection with the intersection size of "intermediate" is an intersection where there is one lane on each side or there are two lanes on each side. An intersection with the intersection size of "large" is an intersection where there are three or more lanes on each side. The threshold correction unit 8j may acquire the intersection size information from at least one of the road-vehicle communication and the navigation system in place of or in addition to the external sensor 2.

Figure 8A:
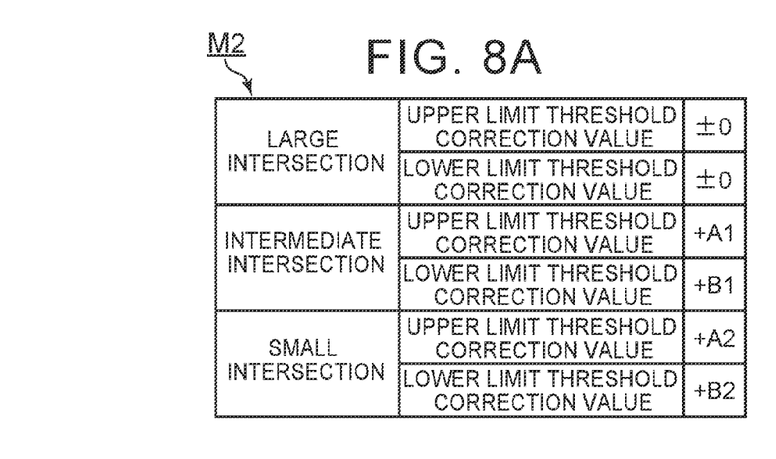
FIG. 8A is a diagram showing an example of a map provided in a threshold correction unit of the warning device shown in FIG. 6.

FIG. 8A is a diagram showing an example of a map provided in the threshold correction unit of the warning device shown in FIG. 6. As shown in FIG. 8A, the threshold correction unit 8j, which has a map M2, references this map M2 to increase or decrease the upper limit threshold Tmax by the upper limit threshold correction value and, at the same time, increase or decrease the lower limit threshold Tmin by the lower limit threshold correction value, based on the intersection size information. In the map M2, A1>A2 and B1>B2. B1 and B2 may be a negative value. The map M2 may be made to correspond to the situation in which the occurrence rate of intersection collision between the host vehicle V and a moving object C is highest when the intersection size is "intermediate" and is next highest when the intersection size is "small".

Figure 8B:
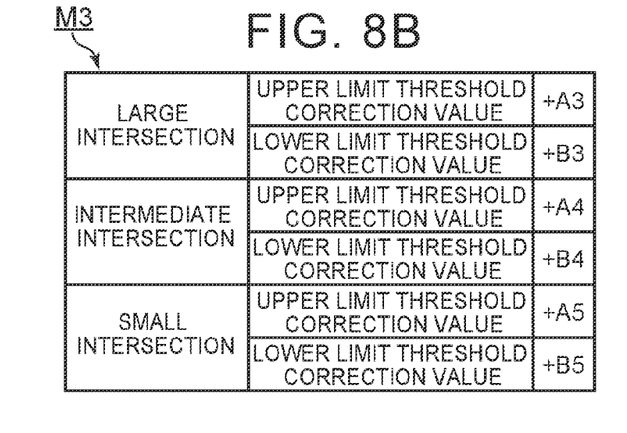
FIG. 8B is a diagram showing another example of a map provided in the threshold correction unit of the warning device shown in FIG. 6.

FIG. 8B is a diagram showing another example of a map provided in the threshold correction unit of the warning device shown in FIG. 6. As shown in FIG. 8B, the threshold correction unit 8j, which has a map M3, may reference this map M3 to increase or decrease the upper limit threshold Tmax by the upper limit threshold correction value and, at the same time, increase or decrease the lower limit threshold Tmin by the lower limit threshold correction value, based on the intersection size information. In the map M3, A3>A4>A5 and B3>B4>B5. B3 to B5 may be a negative value. The map M3 may be made to correspond to the situation in which there is a possibility that the larger the intersection size is, the larger the traffic amount is.

Figure 8C:
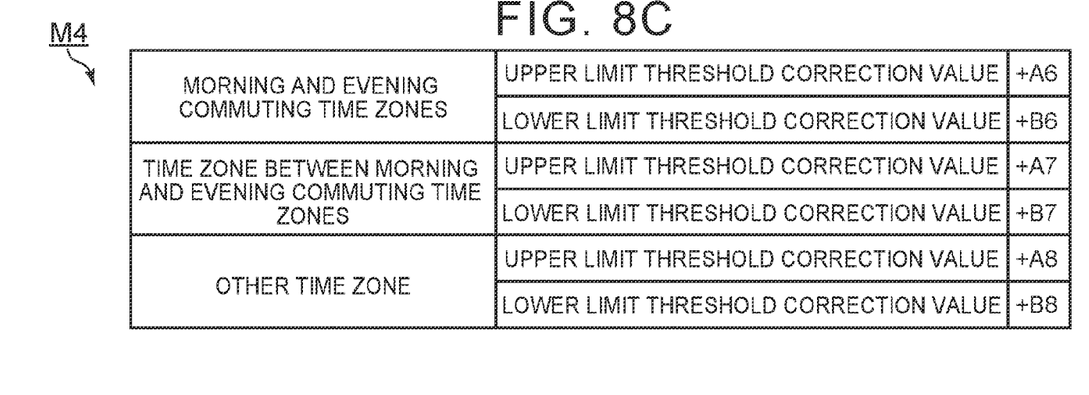
FIG. 8C is a diagram showing still another example of a map provided in the threshold correction unit of the warning device shown in FIG. 6.

FIG. 8C is a diagram showing still another example of a map provided in the threshold correction unit of the warning device shown in FIG. 6. The threshold correction unit 8j acquires the current time-of-day information on the current time-of-day, for example, from the clocking device mounted in the host vehicle V. The threshold correction unit 8j corrects the upper limit threshold Tmax and the lower limit threshold Tmin, which are set by the threshold setting unit 8g, based on the acquired current time-of-day information. The threshold correction unit 8j acquires the current time-of-day information from at least one of the road-vehicle communication and the navigation system in place of or in addition to the clocking device.

As shown in FIG. 8C, the threshold correction unit 8j, which has a map M4, references this map M4 to increase or decrease the upper limit threshold Tmax by the upper limit threshold correction value and, at the same time, increase or decrease the lower limit threshold Tmin by the lower limit threshold correction value, based on the current time-of-day information. In the map M4, A6>A7>A8 and B6>B7>B8. B6 to B8 may be a negative value. The map M4 may be made to correspond to the situation in which the traffic amount is largest in the morning and evening commuting time zones and is next largest in the time zone between the commuting time zones. The threshold correction unit 8j may acquire a large-traffic-amount time zone for each road section from the navigation system and, if the host vehicle V is traveling in that road section and if the current time-of-day is in the large-traffic-amount time zone, increase the upper limit threshold Tmax and the lower limit threshold Tmin.

Figure 9:
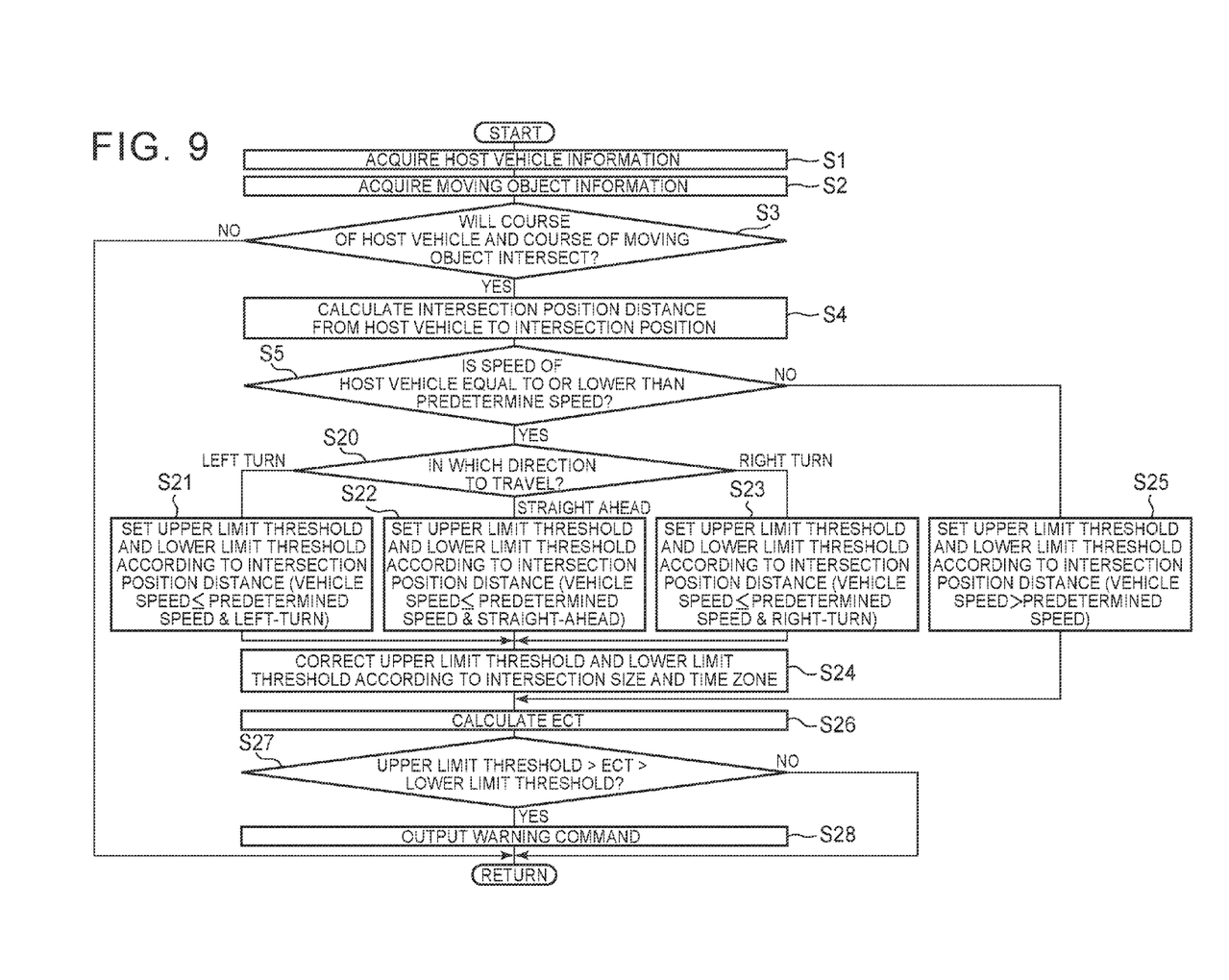
FIG. 9 is a flowchart showing the warning processing in the warning device shown in FIG. 6.

In the above description, the threshold correction unit 8*j* corrects the upper limit threshold Tmax and the lower limit threshold Tmin based on the intersection size information and corrects the upper limit threshold Tmax and the lower limit threshold Tmin based on the current time-of-day information. Instead, the threshold correction unit 8*j* may perform one of these corrections. In addition, as shown in the expression given below, the threshold correction unit 8*j* may perform correction by acquiring the traffic amount Z of the lane, in which the host vehicle V travels, from the detection result of the external sensor 2 and by adding the value, generated by multiplying this traffic amount by the coefficient K, to each of the upper limit threshold Tmax and the lower limit threshold Tmin that are set by threshold setting unit 8*g*. The threshold correction unit 8*j* is applicable also to the first embodiment described above, in which case the threshold T may be corrected by a threshold correction unit similar to the threshold correction unit 8*j*. That is, in the first embodiment described above, the threshold T may be corrected based on at least one of the intersection size information and the current time-of-day information. Upper limit threshold Tmax=Upper limit threshold Tmax+Coefficient K×Traffic amount Z Lower limit threshold Tmin=Lower limit threshold Tmin+Coefficient K×Traffic amount Z Next, the processing performed by the warning device 200 is described in detail with reference to the flowchart shown in FIG. 9. FIG. 9 is a flowchart showing the warning processing of the warning device 200. As shown in FIG. 9, if the determination result of S5, in which a determination is made as to whether the vehicle speed of the host vehicle V is equal to or lower than the predetermined speed, is Yes, the traveling direction determination unit 8*i* determines whether the host vehicle V travels straight ahead, turn left, or turn right based on the host vehicle information (S20).

When the host vehicle V turns left, the threshold setting unit 8*g* sets the values in the range of the intersection position distance X, corresponding to the case of "vehicle speed≤predetermined speed & left-turn" in the map M1, as the upper limit threshold Tmax and the lower limit threshold Tmin (S21).

When the host vehicle V travels straight ahead, the threshold setting unit 8*g* sets the values in the range of the intersection position distance X, corresponding to the case of "vehicle speed≤predetermined speed & straight-ahead" in the map M1, as the upper limit threshold Tmax and the lower limit threshold Tmin (S22).

When the host vehicle V turns right, the threshold setting unit 8*g* sets the values in the range of the intersection position distance X, corresponding to the case of "vehicle speed≤predetermined speed & right-turn" in the map M1, as the upper limit threshold Tmax and the lower limit threshold Tmin (S23).

After S21, S22, and S23 described above, the threshold correction unit 8*j* corrects the upper limit threshold Tmax and the lower limit threshold Tmin using the values of the corresponding intersection size in the map M2 and the map M3. The threshold correction unit 8*j* corrects the upper limit threshold Tmax and the lower limit threshold Tmin using the values of the corresponding time zone in the map M4 (S24).

On the other hand, if the determination result of S5, in which a determination is made as to whether the vehicle speed of the host vehicle V is equal to or lower than the predetermined speed, is No, the threshold setting unit 8*g* sets the values in the range of the intersection position distance X, corresponding to the case of "vehicle speed>predetermined speed" in the map M1, as the upper limit threshold Tmax and the lower limit threshold Tmin (S25).

After S24 or S25, the estimated crossing-time calculation unit 8*e* calculates the ECT based on the moving object information and the intersection position P (S26). If the calculated ECT is smaller than the upper limit threshold Tmax and is larger than the lower limit threshold Tmin, the warning command output unit 8*h* outputs a warning command that causes the warning unit 6 to output a warning (S27, S28). As a result, the warning unit 6 outputs a warning in response to the input of the warning command. If the calculated ECT is equal to or larger than the upper limit threshold Tmax or is equal to or smaller than the lower limit threshold Tmin, the warning processing in this cycle is terminated immediately and the processing proceeds to the warning processing in the next cycle.

As described above, the warning device 200 in this embodiment achieves the effect similar to the that in the first embodiment described above, that is, the warning device 200 achieves the effect that a warning can be output at an appropriate time at an intersection.

The warning device 200 in this embodiment sets the upper limit threshold Tmax as well as the lower limit threshold Tmin and, if the calculated ECT is equal to or smaller than the lower limit threshold Tmin, the warning unit 6 does not output a warning. This reduces the output of a warning about a moving object C that is estimated to pass the intersection position P before the host vehicle V arrives there.

While the embodiments of the present invention have been described, it is to be understood that the present invention is not limited to the embodiments above but may be implemented in various modes Although, in the embodiments described above, S2 in which the moving object information is acquired is performed after S1 in which the host vehicle information is acquired, S1 may be performed after S2.

In the embodiments described above, a part of each function of the ECU 8, that is, a part of the host vehicle information acquisition unit 8*a*, moving object information acquisition unit 8*b*, intersection determination unit 8*c*, distance calculation unit 8*d*, estimated crossing-time calculation unit 8*e*, vehicle speed determination unit 8*f*, threshold setting unit 8*g*, warning command output unit 8*h*, traveling direction determination unit 8*i*, and threshold correction unit 8*j* may be performed by a computer in the facilities such as an information processing center that can communicate with the host vehicle V.

What is claimed is:

1. A warning device comprising:
   a host vehicle information acquisition unit configured to acquire host vehicle information that includes a traveling direction and a vehicle speed of a host vehicle;
   a moving object information acquisition unit configured to acquire moving object information that includes a position, a moving direction, and a moving speed of a moving object around the host vehicle;
   an intersection determination unit configured to determine whether a course of the host vehicle and a course of the moving object intersect, based on the host vehicle information and the moving object information;
   a distance calculation unit configured to calculate an intersection position distance when the intersection determination unit determines that the course of the host vehicle and the course of the moving object intersect, the intersection position distance being a distance from the host vehicle to an intersection position at which the course of the host vehicle and course of the moving object intersect;

an estimated crossing-time calculation unit configured to calculate an estimated crossing-time based on the intersection position and the moving object information, the estimated crossing-time being a time that elapses before the moving object arrives at the intersection position;

a vehicle speed determination unit configured to determine whether the vehicle speed of the host vehicle is equal to or lower than a pre-set predetermined speed based on the host vehicle information;

a threshold setting unit configured to set a threshold based on the intersection position distance and a determination result of the vehicle speed determination unit; and a warning unit configured to output a warning that alerts a driver of the host vehicle to the moving object when the estimated crossing-time is smaller than the threshold, wherein the threshold setting unit is configured to set the threshold larger as the intersection position distance becomes larger, and set the threshold larger when the vehicle speed of the host vehicle is determined equal to or lower than the predetermined speed than when the vehicle speed of the host vehicle is determined higher than the predetermined speed.

2. The warning device according to claim 1, wherein the threshold setting unit is configured to set the threshold larger when the intersection position distance is equal to or larger than a pre-set specified distance than when the intersection position distance is smaller than the specified distance.

3. The warning device according to claim 1, further comprising
a threshold correction unit configured to correct the threshold based on at least one of intersection size information and current time-of-day information, the intersection size information being information on a size of an intersection into which the host vehicle enters, the current time-of-day information being information on a current time-of-day.

4. A warning device comprising:
a host vehicle information acquisition unit configured to acquire host vehicle information that includes a traveling direction and a vehicle speed of a host vehicle;
a moving object information acquisition unit configured to acquire moving object information that includes a position, a moving direction, and a moving speed of a moving object around the host vehicle;
an intersection determination unit configured to determine whether a course of the host vehicle and a course of the moving object intersect, based on the host vehicle information and the moving object information;

a distance calculation unit configured to calculate an intersection position distance when the intersection determination unit determines that the course of the host vehicle and the course of the moving object intersect, the intersection position distance being a distance from the host vehicle to an intersection position at which the course of the host vehicle and course of the moving object intersect;

an estimated crossing-time calculation unit configured to calculate an estimated crossing-time based on the intersection position and the moving object information, the estimated crossing-time being a time that elapses before the moving object arrives at the intersection position;

a vehicle speed determination unit configured to determine whether the vehicle speed of the host vehicle is equal to or lower than a pre-set predetermined speed based on the host vehicle information;

a threshold setting unit configured to set an upper limit threshold and a lower limit threshold based on the intersection position distance and a determination result of the vehicle speed determination unit; and a warning unit configured to output a warning that alerts a driver of the host vehicle to the moving object when the estimated crossing-time is smaller than the upper limit threshold and is larger than the lower limit threshold, wherein the threshold setting unit is configured to set the upper limit threshold and the lower limit threshold larger as the intersection position distance become larger, and set the upper limit threshold and the lower limit threshold larger when the vehicle speed of the host vehicle is determined equal to or lower than the predetermined speed than when the vehicle speed of the host vehicle is determined higher than the predetermined speed.

5. The warning device according to claim 4, wherein the threshold setting unit is configured to set the upper limit threshold and the lower limit threshold larger when the intersection position distance is equal to or larger than a pre-set specified distance than when the intersection position distance is smaller than the specified distance.

6. The warning device according to claim 4, further comprising
a threshold correction unit configured to correct the upper limit threshold and the lower limit threshold based on at least one of intersection size information and current time-of-day information, the intersection size information being information on a size of an intersection into which the host vehicle enters, the current time-of-day information being information on a current time-of-day.

* * * * *